(12) United States Patent
Sugie

(10) Patent No.: US 11,624,487 B2
(45) Date of Patent: Apr. 11, 2023

(54) VEHICLE LAMP

(71) Applicant: STANLEY ELECTRIC CO., LTD., Tokyo (JP)

(72) Inventor: Yuta Sugie, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/580,276

(22) Filed: Jan. 20, 2022

(65) Prior Publication Data

US 2022/0235909 A1 Jul. 28, 2022

(30) Foreign Application Priority Data

Jan. 22, 2021 (JP) .............................. JP2021-009076

(51) Int. Cl.
| | |
|---|---|
| F21S 41/24 | (2018.01) |
| F21V 8/00 | (2006.01) |
| F21S 41/141 | (2018.01) |
| F21S 41/143 | (2018.01) |
| F21S 41/32 | (2018.01) |
| F21S 41/151 | (2018.01) |
| F21S 41/43 | (2018.01) |

(52) U.S. Cl.
CPC ............. *F21S 41/24* (2018.01); *F21S 41/141* (2018.01); *F21S 41/143* (2018.01); *F21S 41/151* (2018.01); *F21S 41/322* (2018.01); *F21S 41/43* (2018.01); *G02B 6/0095* (2013.01)

(58) Field of Classification Search
CPC ........ F21S 41/24; F21S 41/322; F21S 41/151; F21S 41/153; F21S 41/143; F21S 41/40; F21S 41/43; F21S 41/50; G02B 9/0095; G02B 6/0095
See application file for complete search history.

(56) References Cited

U.S. PATENT DOCUMENTS

| | | | | |
|---|---|---|---|---|
| 2012/0026746 | A1* | 2/2012 | Schug | F21S 41/16 362/311.12 |
| 2014/0151726 | A1* | 6/2014 | Maeda | F21S 41/322 257/88 |
| 2015/0124469 | A1* | 5/2015 | Krenn | G02B 6/0068 362/511 |
| 2017/0009952 | A1* | 1/2017 | Tai | F21S 41/322 |
| 2018/0292061 | A1* | 10/2018 | Taudt | F21S 41/663 |

(Continued)

FOREIGN PATENT DOCUMENTS

JP 2011-222339 A 11/2011

*Primary Examiner* — Erin Kryukova
(74) *Attorney, Agent, or Firm* — Kenealy Vaidya LLP

(57) ABSTRACT

A vehicle lamp has a light guiding body having a light guide section having a dimension in which a dimension in one direction perpendicular to an optical axis of the light emitted from the light source is smaller than a dimension in other direction perpendicular to the optical axis and the one direction, an incidence section that causes the light emitted from the light source to enter the light guide section, and an emission section that emits the light guided inside of the light guide section to outside of the light guide section, the shade has an opening section through which light that has entered the incidence section passes, and at a cross section in the one direction, the optical axis is located at a position offset toward one side in the one direction with respect to a central axis of the light guide section.

15 Claims, 6 Drawing Sheets

(56) References Cited

U.S. PATENT DOCUMENTS

| | | | | |
|---|---|---|---|---|
| 2019/0338930 A1* | 11/2019 | Spinger | ............... | H01S 5/02253 |
| 2020/0132268 A1* | 4/2020 | Zhang | ................... | F21S 41/322 |
| 2020/0191356 A1* | 6/2020 | Zozgornik | .............. | F21S 41/24 |
| 2021/0348732 A1* | 11/2021 | Renaud | ................. | F21S 41/322 |
| 2021/0348735 A1* | 11/2021 | Bak | ....................... | F21S 41/151 |

* cited by examiner

VEHICLE LAMP

CROSS-REFERENCE TO RELATED APPLICATION

Priority is claimed on Japanese Patent Application No. 2021-009076, filed Jan. 22, 2021, the content of which is incorporated herein by reference.

BACKGROUND OF THE INVENTION

Field of the Invention

The present invention relates to a vehicle lamp.

Description of Related Art

In the related art, as a vehicle lamp mounted on a vehicle, a configuration in which a light source such as a light emitting diode (LED) or the like and a light guiding body such as an inner lens or the like are combined is known (for example, see Japanese Unexamined Patent Application, First Publication No. 2011-222339).

In such a vehicle lamp, light emitted from a light source enters a light guiding body from an incidence surface of the light guiding body, and the light is guided through the light guiding body and emitted to the outside of the light guiding body from an emission surface of the light guiding body. Accordingly, it is possible to emit light from the emission surface of the light guiding body as a light emitting surface of the vehicle lamp.

SUMMARY OF THE INVENTION

Incidentally, in the above-mentioned vehicle lamp, for example, when the light guiding body is seen above obliquely, there is a case in which the appearance of the light guiding body is deteriorated due to light that leaks from the upper surface of the light guiding body without being totally reflected inside the light guiding body (so-called leaking light).

In addition, among light guiding bodies, there is a light guiding body having a configuration with an oblong shape in which a dimension in one direction perpendicular to an optical axis of light emitted from a light source (for example, a longitudinal direction) is smaller than a dimension in another direction perpendicular to the optical axis and the one direction (for example, a lateral direction).

In this case, among the light radially emitted from the light source, light within a relatively narrow angular range in a longitudinal direction enters the light guiding body, and light within a relatively wide angular range in a lateral direction enters the light guiding body. Accordingly, in such a light guiding body, light in the longitudinal direction shines stronger than in the lateral direction, and when light leaks from the above-mentioned upper surface, the appearance at the time of lighting becomes worse.

An aspect of the present invention provides a vehicle lamp capable of emission with a good appearance.

The present invention provides the following configurations.

(1) A vehicle lamp including:
a light source;
a light guiding body configured to guide light emitted from the light source; and
a shade configured to shield surroundings of the light guiding body,
wherein the light guiding body has:
a light guide section that is located in front of the light source and that has a dimension in which a dimension in one direction perpendicular to an optical axis of the light emitted from the light source is smaller than a dimension in other direction perpendicular to the optical axis and the one direction;
an incidence section that is located on a side of the light guide section facing the light source and that is configured to cause the light emitted from the light source to enter the light guide section; and
an emission section that is located on a side of the light guide section opposite to the incidence section and that is configured to emit the light guided inside of the light guide section to an outside of the light guide section,
wherein the shade has an opening section through which light that has entered the incidence section among the light emitted from the light source passes, and
wherein, at a cross section in the one direction, the optical axis is located at a position offset toward one side in the one direction with respect to a central axis of the light guide section.

(2) The vehicle lamp according to the above-mentioned (1), wherein, among the light radially emitted from the light source, only light that has been restricted within a predetermined angular range in the one direction enters the incidence section.

(3) The vehicle lamp according to the above-mentioned (2), wherein an angular range of the light passed through the opening section on one side with respect to the optical axis is smaller than an angular range of the light passed through the opening section on other side with respect to the optical axis.

(4) The vehicle lamp according to the above-mentioned (2) or (3), wherein the incidence section has a first incidence surface that is flat in the cross section in the one direction.

(5) The vehicle lamp according to the above-mentioned (4), wherein the incidence section has a second incidence surface inclined forward from one side and/or other side with respect to the first incidence surface in the cross section in the one direction.

(6) The vehicle lamp according to the above-mentioned (4) or (5), wherein the shade has an inclined surface inclined forward from one side and/or other side of the shade with the opening section being interposed therebetween in the cross section in the one direction, and
the inclined surface is inclined at a non-contact angle with the light passed through the opening section.

(7) The vehicle lamp according to the above-mentioned (1) to (6), wherein the opening section is located between the light source and the incidence section.

(8) The vehicle lamp according to the above-mentioned (1) to (6), wherein the incidence section is located inside the opening section.

(9) The vehicle lamp according to the above-mentioned (8), wherein the opening section and the incidence section have shapes that match with each other.

(10) The vehicle lamp according to the above-mentioned (1) to (9), wherein a plurality of the light source are provided next to each other in the other direction.

(11) The vehicle lamp according to the above-mentioned (1) to (10), comprises an extension that is located on one side in the one direction with respect to the light guide section and that is configured to cover surroundings of the light guiding body.

According to the aspect of the present invention, it is possible to provide a vehicle lamp capable of emission with a good appearance.

DETAILED DESCRIPTION OF THE INVENTION

Figure 1:
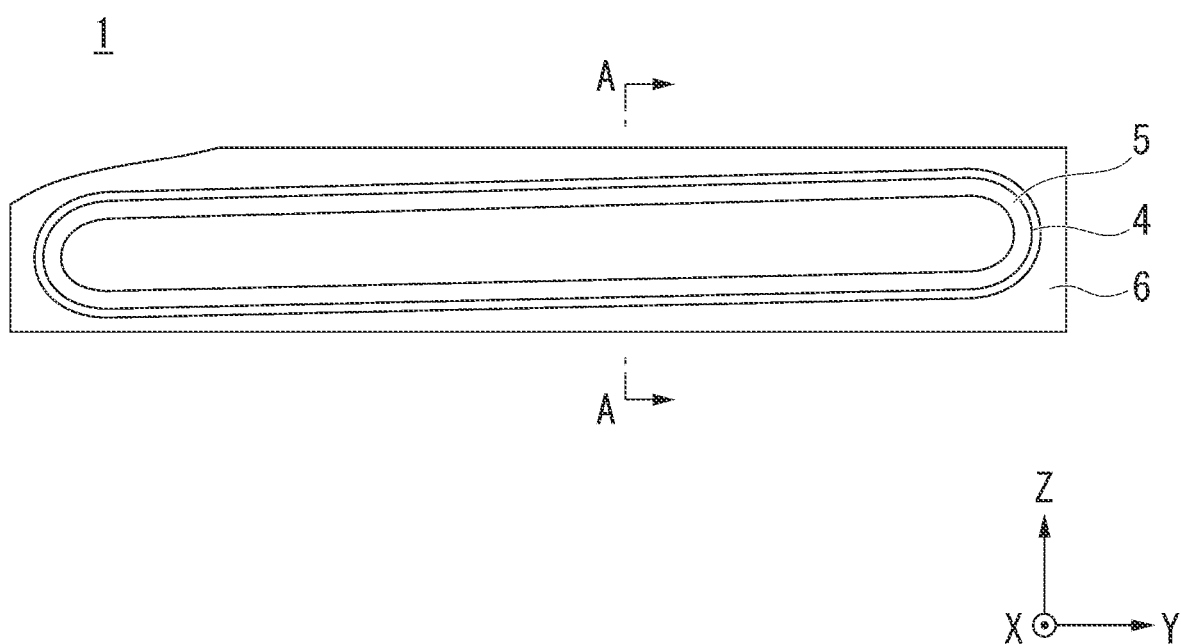
FIG. 1 is a front view showing a configuration of a vehicle lamp according to an embodiment of the present invention.

Hereinafter, an embodiment of the present invention will be described in detail with reference to the accompanying drawings.

Further, in the drawings used in the following description, in order to make components easier to see, the scales of dimensions may be shown differently depending on the components, and dimensional ratios and the like of each component may not be the same as the actual ones.

Figure 2:
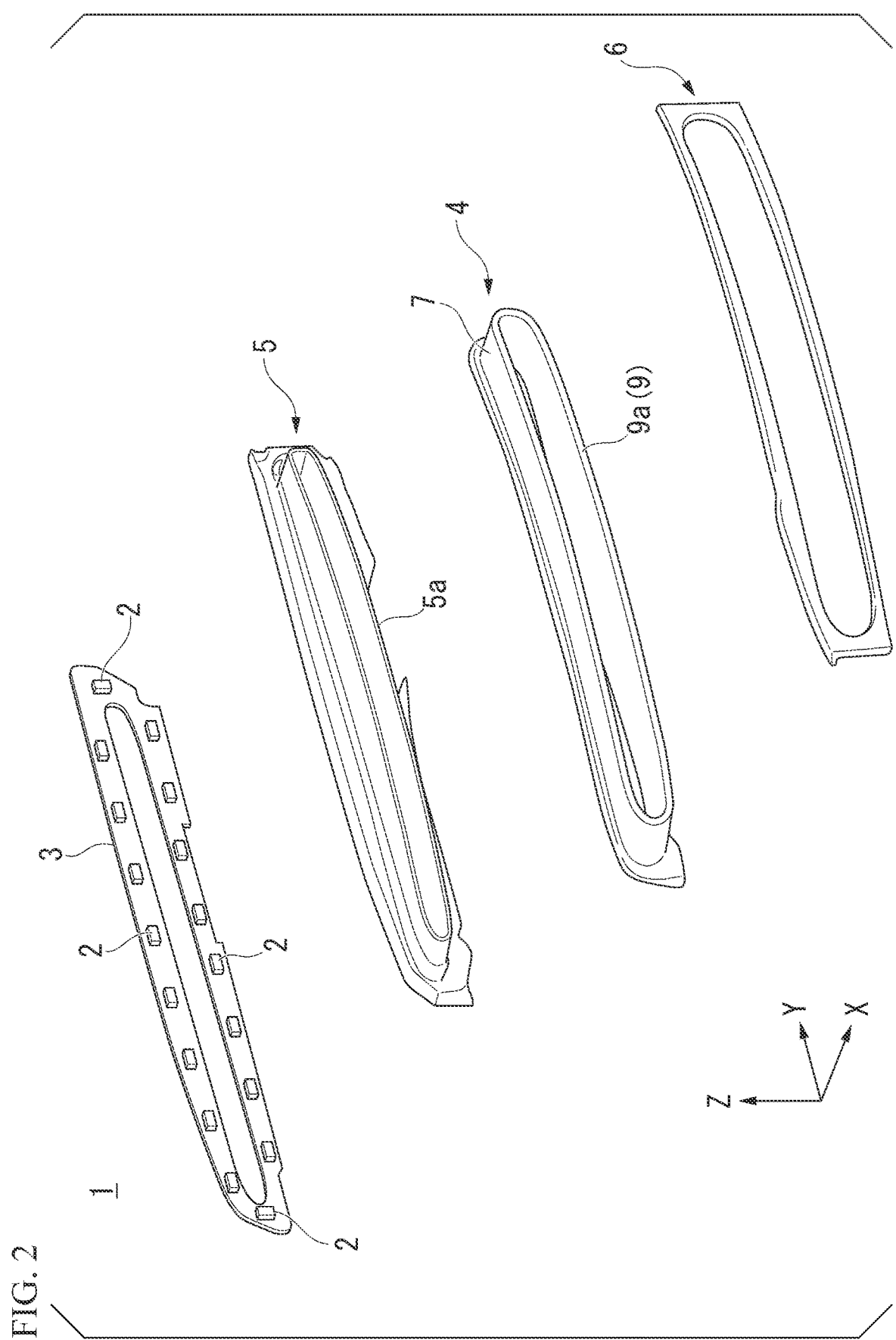
FIG. 2 is an exploded perspective view showing the configuration of the vehicle lamp shown in FIG. 1.
Figure 3:
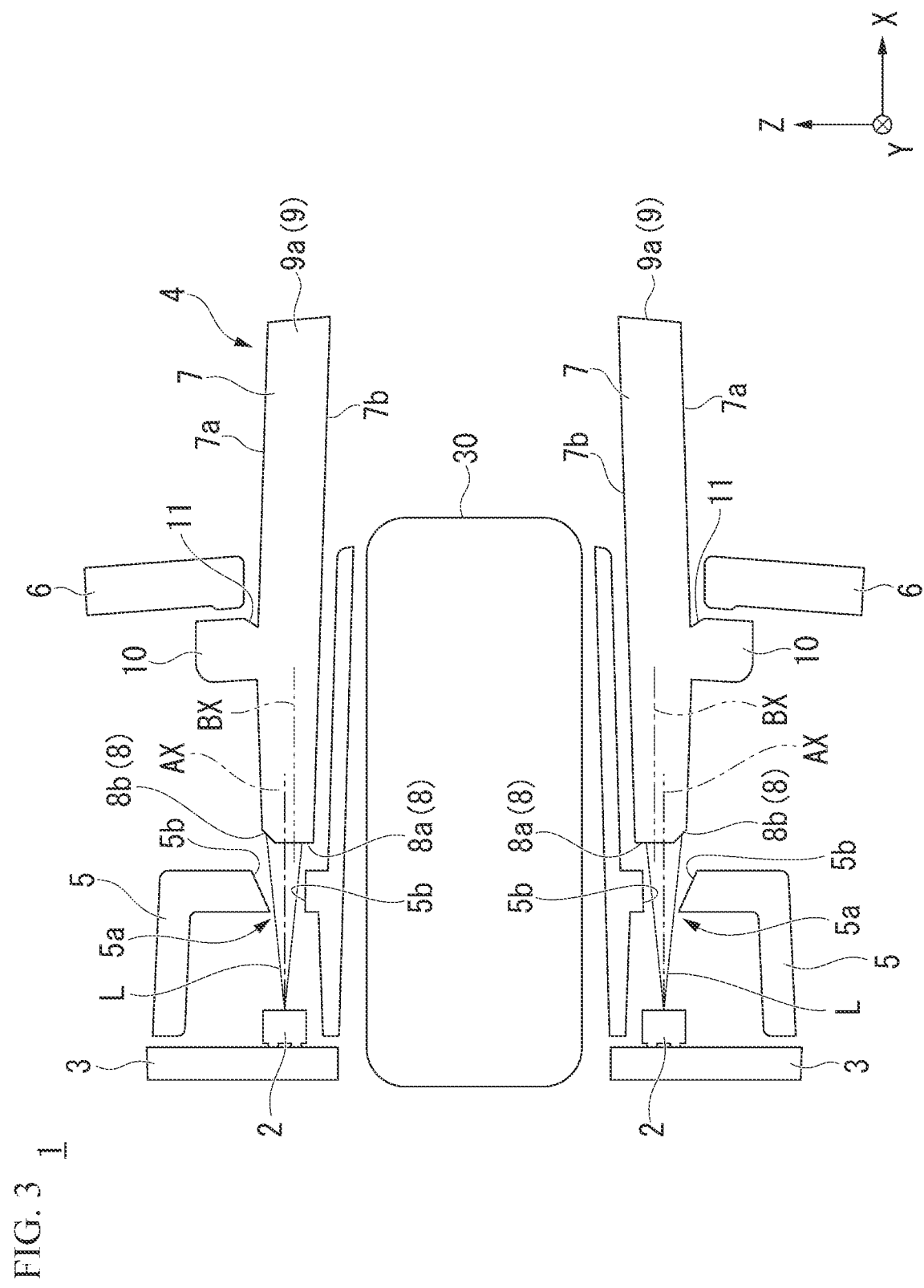
FIG. 3 is a cross-sectional view of the vehicle lamp along a line segment A-A shown in FIG. 1.
Figure 4:
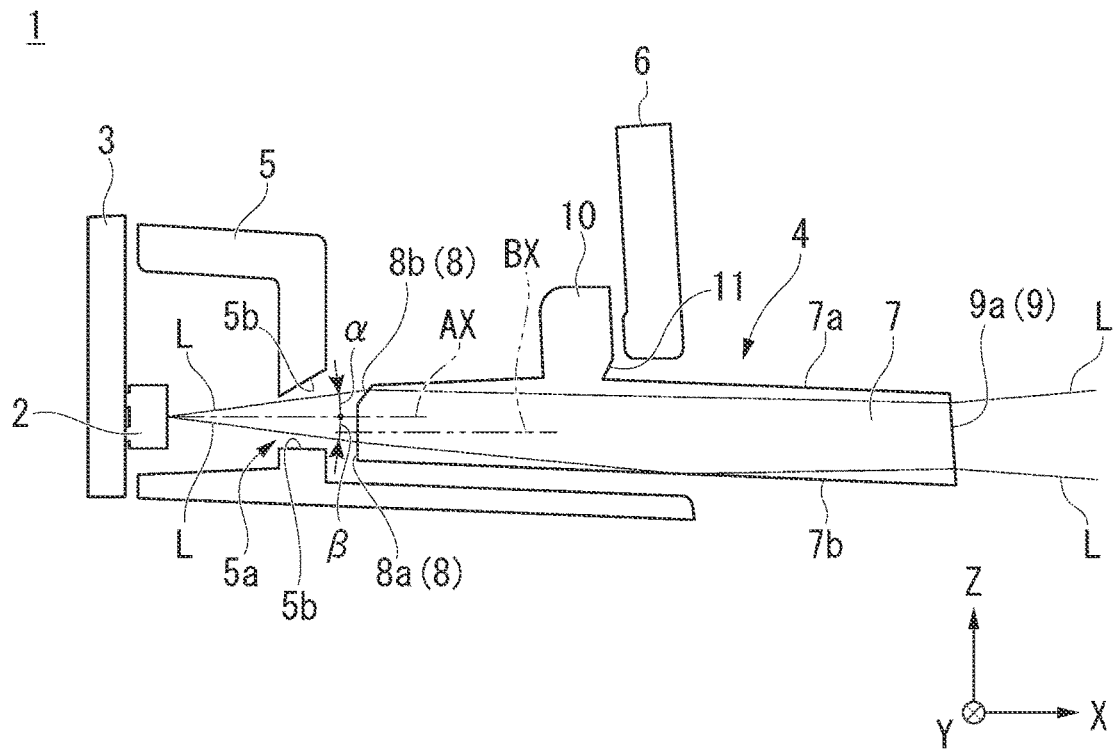
FIG. 4 is an enlarged cross-sectional view of a major part of the vehicle lamp shown in FIG. 3.

As an embodiment of the present invention, for example, a vehicle lamp 1 shown in FIG. 1 to FIG. 4 will be described. Further, FIG. 1 is a front view showing a configuration of the vehicle lamp 1. FIG. 2 is an exploded perspective view showing the configuration of the vehicle lamp 1. FIG. 3 is a cross-sectional view of the vehicle lamp along a line segment A-A shown in FIG. 1. FIG. 4 is an enlarged cross-sectional view of a major part of the vehicle lamp 1.

In addition, in the drawings to be described below, an XYZ orthogonal coordinate system is set, in which an X-axis direction indicates a forward/rearward direction (lengthwise direction) of the vehicle lamp 1, a Y-axis direction indicates a leftward/rightward direction (widthwise direction) of the vehicle lamp 1, and a Z-axis direction indicates an upward/downward direction (height direction) of the vehicle lamp 1.

The vehicle lamp 1 of the embodiment is obtained by applying the present invention to, for example, a tail lamp that emits red light, in rear combination lamps mounted on both corner sections of a rear end side (in the embodiment, a corner section on a left rear end side) of a vehicle (not shown).

Further, in the following description, descriptions of "forward," "rearward," "leftward," "rightward," "upward" and "downward" are not particularly limiting, and refer to directions when the vehicle lamp 1 is seen from a front surface thereof (a rear side of the vehicle). Accordingly, directions when the vehicle is seen from a front surface thereof (a front side of the vehicle) are directions opposite to these forward, rearward, leftward and rightward directions.

Specifically, as shown in FIG. 1 to FIG. 3, the vehicle lamp 1 includes a circuit board 3 on which a plurality of light sources 2 are disposed, a light guiding body 4 configured to guide light L emitted from the plurality of light sources 2, a shade 5 configured to shield surroundings of the light guiding body 4, and an extension 6 configured to cover the surroundings of the light guiding body 4, inside the lighting body.

Further, the lighting body is constituted by a housing, a front surface of which is open, and a transparent lens cover (outer cover) configured to cover an opening of the housing. Further, a shape of the lighting body can be appropriately changed in accordance with a design of the vehicle.

The light source 2 is constituted by a light emitting diode (LED) configured to emit red light (hereinafter, simply referred to as "light") L. The light sources 2 are mounted on the side of one surface (in the embodiment, a front surface) of the circuit board 3, on which a driving circuit configured to drive the LED is provided. Accordingly, the light sources 2 radially emit light L forward toward the light guiding body 4.

Further, while the circuit board 3 has a configuration in which the driving circuit configured to drive the LED is provided, a mounting board on which the LED is provided and a circuit board on which the driving circuit is provided may be separately disposed, the mounting board and the circuit board may be electrically connected via a wiring cord referred to as a harness, and the driving circuit may be protected from heat emitted from the LED.

The light guiding body 4 is constituted by light transmissive members configured to guide light L emitted from the light sources 2. The light transmissive members may be formed of a material having a higher refractive index than air, for example, a transparent resin such as polycarbonate, acryl, or the like, glass, or the like.

The light guiding body 4 has a light guide section 7 located in front of the light sources 2, an incidence section 8 located at a side of the light guide section 7 facing the light sources 2, and an emission section 9 located at a side of the light guide section 7 opposite to the incidence section 8.

The light guide section 7 constitutes a portion configured to guide light L forward between the incidence section 8 located at a rear end side of the light guide section 7 and the emission section 9 located at a front end side of the light guide section 7. Specifically, the light guide section 7 has a ring shape elongated in a widthwise direction when seen in a front view. In addition, the light guide section 7 is formed in a plate shape with a predetermined thickness in the forward/rearward direction.

The plurality of light sources 2 are provided next to each other on a front surface side of the circuit board 3 in a ring shape at predetermined intervals so as to overlap the light guide section 7 when seen in a front view. Further, the number of the light sources 2 and the intervals are not particularly limited, however it is desirable to adjust the emission section 9 of the light guiding body 4 appropriately so that light is emitted in a ring shape uniformly.

Accordingly, the light guide section 7 has a shape in which a dimension in one direction perpendicular to an optical axis AX of the light L emitted from the light sources 2 is smaller than a dimension in another direction perpendicular to the optical axis AX and the one direction. In addition, the plurality of light sources 2 are provided next to each other in the other direction.

Further, the embodiment will be described with reference to a position where the one direction is a longitudinal direction and the other direction is a lateral direction (in a longitudinal cross section of the vehicle lamp 1) unless otherwise noted.

In addition, a light emitting unit 30 that constitutes a stop lamp is disposed inside the light guide section 7. Further, while the configuration of the light emitting unit 30 is omitted in the embodiment, the configuration is not particularly limited as long as it functions as a stop lamp.

The incidence section 8 constitutes a portion in which light L emitted from the light sources 2 enters the light guide section 7. Specifically, in a cross section in the one direction (longitudinal direction), the incidence section 8 has a first incidence surface 8a that is flat, and a second incidence surface 8b inclined forward from one side (in the embodiment, an outer circumferential side) of the incidence section 8 with respect to the first incidence surface 8a.

In the incidence section 8, among light L radially emitted from the light sources 2, light L within a relatively narrow angular range in the one direction (longitudinal direction) enters the light guide section 7 from the first incidence surface 8a and the second incidence surface 8b. That is, among the light L radially emitted from the light sources 2, only the light L restricted within the predetermined angular range in the one direction (longitudinal direction) enters the incidence section 8.

Meanwhile, in the incidence section 8, the light L within the relatively wide angular range in the other direction (lateral direction) enters the light guide section 7 from the first incidence surface 8a and the second incidence surface 8b. That is, among the light L radially emitted from the light sources 2, the light L within the entire angular range in the other direction enters the incidence section 8. Accordingly, the light L that has entered the light guide section 7 is diffused and guided toward the emission section 9 on the front side.

The emission section 9 constitutes a portion configured to emit the light L guided into the light guide section 7 to the outside of the light guide section 7. Specifically, the emission section 9 has a flat emission surface 9a at a cross section in the one direction (longitudinal direction). In the emission section 9, the light L guided into the light guide section 7 is emitted from the emission surface 9a to the outside of the light guide section 7. Accordingly, in the vehicle lamp 1, as a light emitting surface of a tail lamp, red light can be emitted from an emission surface 14a.

The shade 5 is constituted by a black light shielding member and has an opening section 5a through which the light L that has entered the incidence section 8 among the light L emitted from the light sources 2 passes. The opening section 5a is disposed between the light sources 2 and the incidence section 8 (the light guiding body 4). In addition, the opening section 5a has a long hole shape elongated in the widthwise direction when seen in a front view in order to pass only the light L that has entered the incidence section 8 (the first incidence surface 8a and the second incidence surface 8b) therethrough. Meanwhile, the shade 5 is provided to surround the light sources 2 to shield the light L that does not pass through the opening section 5a.

At the cross section in the one direction (longitudinal direction), the shade 5 has an inclined surface 5b inclined forward from one side (outer circumferential side) and the other side (inner circumferential side) of the shade 5 with the opening section 5a being interposed therebetween. The inclined surface 5b is inclined at a non-contact angle with the light L passing through the opening section 5a. Accordingly, the light L passing through the opening section 5a can be prevented from being reflected by the inclined surface 5b and becoming stray light.

Further, the inclined surface 5b is not particularly limited to the configuration as being provided on one side (outer circumferential side) and the other side (inner circumferential side) of the shade 5 with the opening section 5a being interposed therebetween and may be provided in either one of the one side (outer circumferential side) and the other side (inner circumferential side). In addition, in some cases, a surface parallel to the optical axis AX may also be provided forward from the one side (outer circumferential side) and/or the other side (inner circumferential side) of the shade 5 with the opening section 5a being interposed therebetween.

The extension 6 is constituted by a colored (for example, black or the like) light shielding member, and provided to cover one side (outer circumferential side) of the extension 6 in the one direction (longitudinal direction) with the light guide section 7 being interposed therebetween. Accordingly, the light guiding body 4 is provided in a state in which a part of the light guide section 7 protrudes forward than the extension 6. In addition, the shade 5 is provided to cover surroundings of an inner side of the light guide section 7 located rearward than the extension 6.

Incidentally, in the vehicle lamp 1 of the embodiment, as shown in FIG. 4, only the light L restricted within the predetermined angular range (narrow angular range) in the above-mentioned one direction (longitudinal direction) enters the incidence section 8. For this reason, the light L that has entered the light guide section 7 is guided toward the emission section 9 on the front side between a surface (hereinafter referred to as "upper surface") 7a of the light guide section 7 on one side (outer circumferential side) in the one direction (longitudinal direction) and a surface (hereinafter referred to as "lower surface") 7b on the other side (inner circumferential side).

In addition, in the vehicle lamp 1 of the embodiment, at the cross section in the one direction (longitudinal direction), the optical axis AX is located at a position offset toward the one side (outer circumferential side) in the one direction (longitudinal direction) with respect to a central axis BX of the light guide section 7. Accordingly, an angular range α of the light L passing through the opening section 5a on the one side (outer circumferential side) with respect to the optical axis AX is smaller than an angular range β of the light L passing through the opening section 5a on the other side (inner circumferential side) with respect to the optical axis AX (α<β).

In this case, among the light L that has entered the light guide section 7, the light L that enters the upper surface 7a of the light guide section 7 can be reduced. In particular, since the light L incident from the second incidence surface 8b is refracted in a direction (downward) in which the light is separated from the upper surface 7a of the light guide section 7, the light L that enters the upper surface 7a of the light guide section 7 can be further reduced.

In addition, in the vehicle lamp 1 of the embodiment, the light L that has entered the upper surface 7a of the light guide section 7 can be totally reflected toward the emission section 9 on the front side. Similarly, the light L that enters the lower surface 7b of the light guide section 7 can be totally reflected toward the emission section 9 on the front side.

As described above, in the vehicle lamp 1 of the embodiment, when the light guiding body 4 is seen from above obliquely, it is possible to prevent the light from leaking from the upper surface 7a of the light guide section 7 (leaked light) without being totally reflected in the light guide section 7, and it is possible to improve the appearance of the light guiding body 4 upon emission.

Further, the second incidence surface 8b is not limited to being provided on one side (outer circumferential side) of the second incidence surface 8b with respect to the first incidence surface 8a, the second incidence surface 8b may be provided on the other side (inner circumferential side) or may also be provided on both sides. Further, the second incidence surface 8b is not limited to being inclined to cut out a corner section of the light guide section 7 on the rear end side and may be inclined in a tapered shape throughout the upper surface 7a and/or the lower surface 7b of the light guide section 7.

Figure 5:
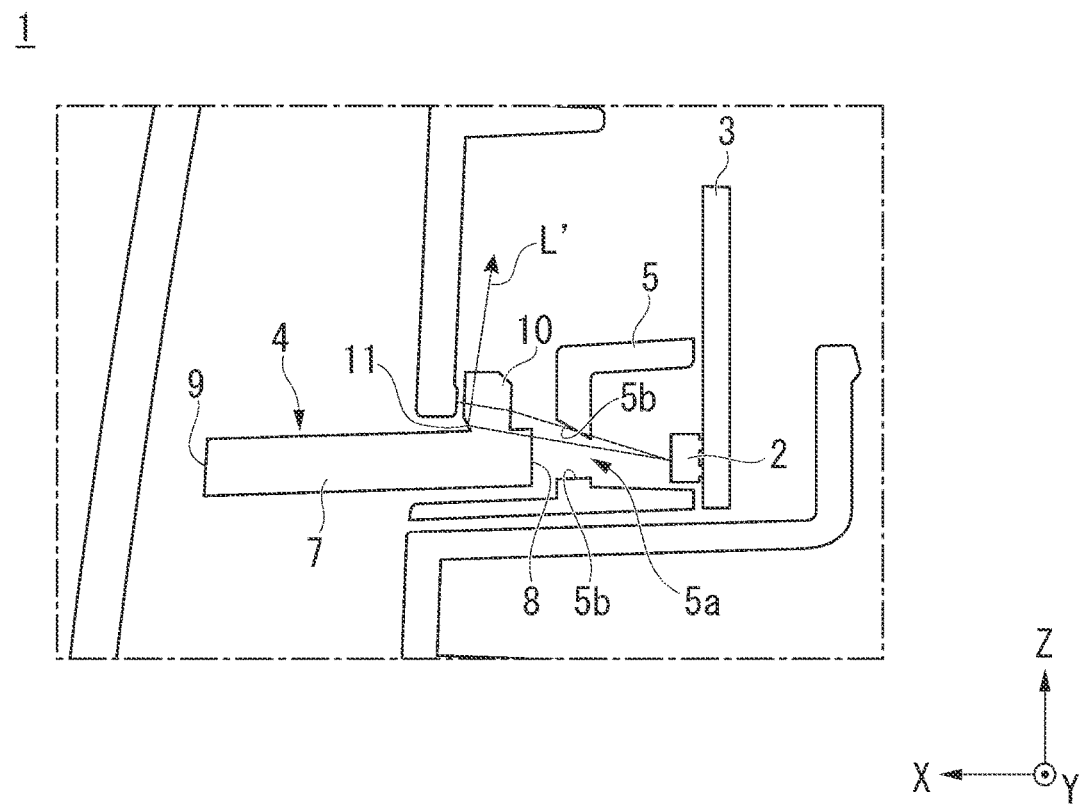
FIG. 5 is an enlarged cross-sectional view of a major part of a light guiding body.

In addition, in the light guiding body 4, as shown in FIG. 5, a protrusion 10 protruding from the upper surface 7a of the light guide section 7 is provided. In the light guiding body 4, a groove section 11 that cuts out the base end section of the protrusion 10 on the front surface side is provided such that light L' that has entered the protrusion 10 is not leaked toward the emission section 9. Accordingly, the light L' that has entered the groove section 11 can be reflected toward the back surface of the extension 6.

Further, the present invention is not particularly limited to the embodiment, and various modifications may be made without departing from the scope of the present invention.

Figure 6A:
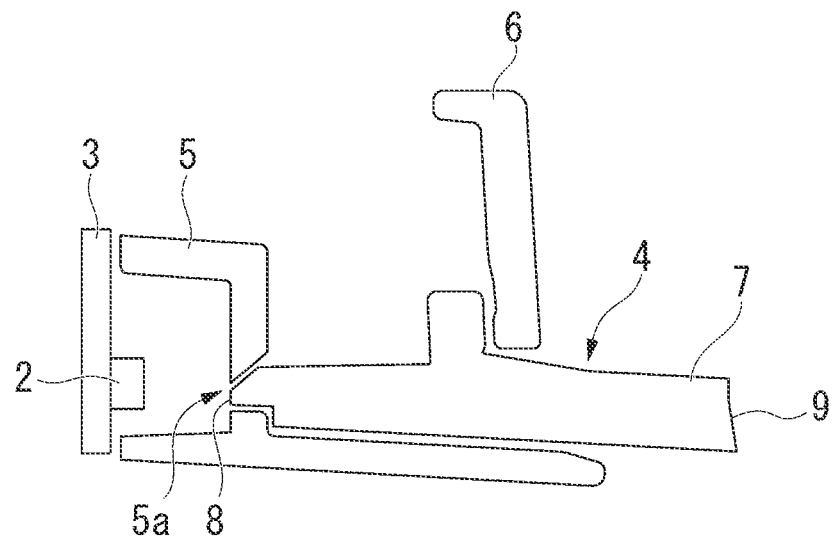
FIG. 6A is a cross-sectional view showing another configuration example of the vehicle lamp.
Figure 6B:
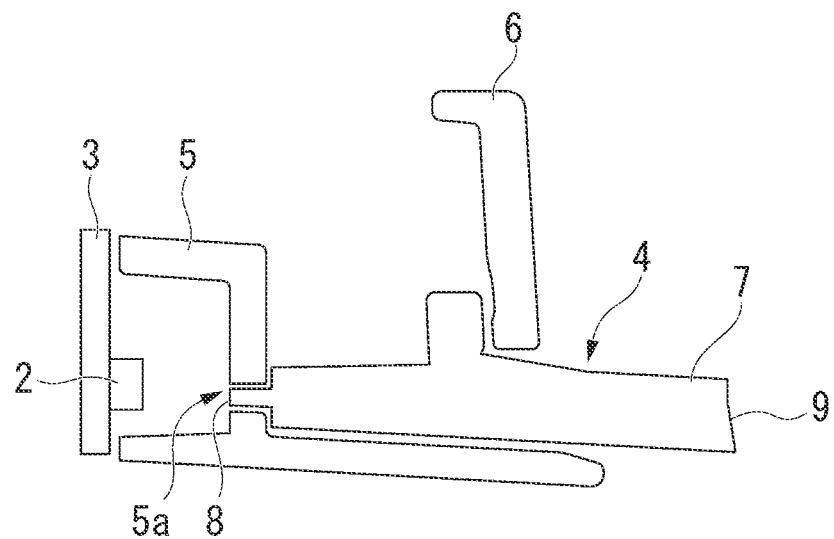
FIG. 6B is a cross-sectional view showing another configuration example of the vehicle lamp.
Figure 6C:
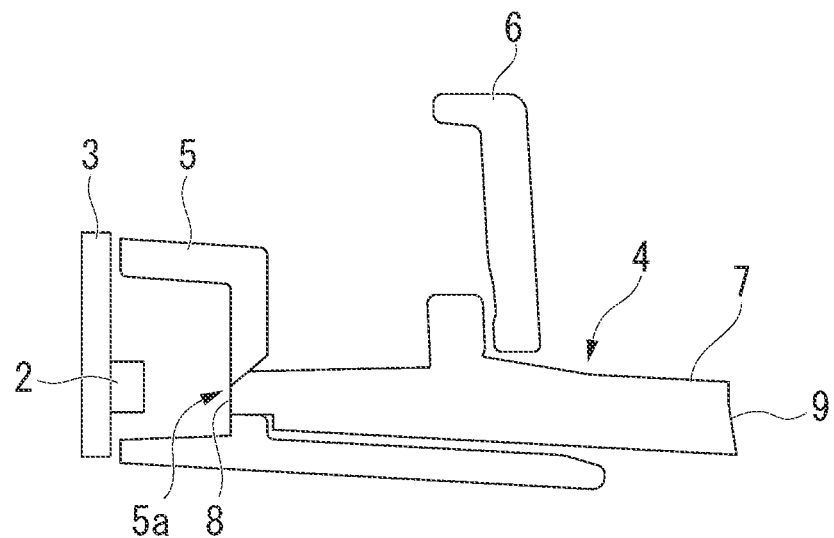
FIG. 6C is a cross-sectional view showing another configuration example of the vehicle lamp.
Figure 6D:
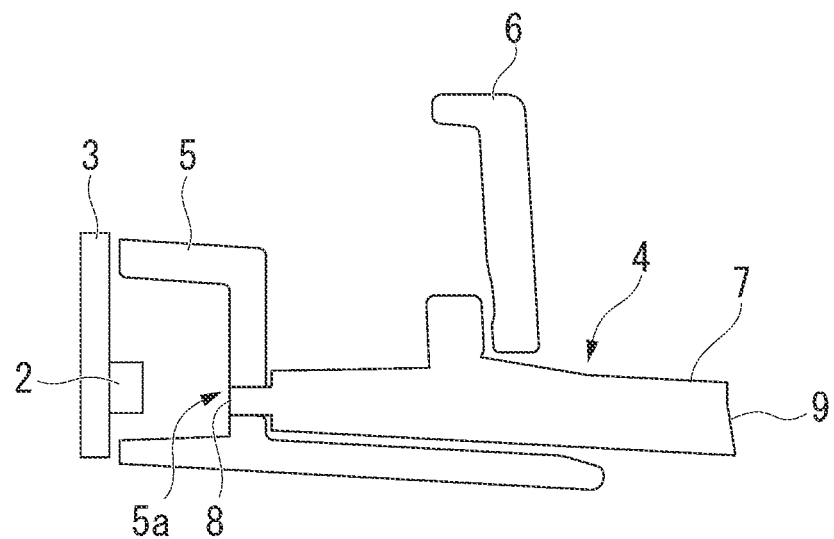
FIG. 6D is a cross-sectional view showing another configuration example of the vehicle lamp.

For example, in the vehicle lamp 1, the opening section 5a is not particularly limited to being located between the light sources 2 and the incidence section 8 (the light guiding body 4), and for example, as shown in FIG. 6A to FIG. 6D, the incidence section 8 may be located inside the opening section 5a. Further, as shown in FIG. 6A and FIG. 6B, the light guiding body 4 and the shade 5 may be separately provided (a configuration with a gap), or as shown in FIG. 6C and FIG. 6D, the light guiding body 4 and the shade 5 may be provided integrally (a configuration with no gap). In particular, in the configuration shown in FIG. 6C and FIG. 6D, the opening section 5a and the incidence section 8 may be formed to match with each other.

Further, regarding the light sources 2, it will be sufficient as long as the light source emits light radially, and a light emitting element such as a laser diode (LD) or the like may be used in addition to the above-mentioned LED. In addition, the plurality of light sources 2 are not necessarily limited to the above-mentioned arrangement disposed next to each other.

In addition, regarding the light guiding body 4, it will be sufficient as long as the light guiding body has a shape (the light guide section 7) in which a dimension in one direction perpendicular to the optical axis AX of the light L emitted from the light sources 2 is smaller than a dimension in the other direction perpendicular to the optical axis AX and the one direction, the shape is not limited to the above-mentioned ring shape and various modifications regarding the shape may be made.

Further, while the case in which the vehicle lamp 1 is applied to the tail lamp included in the rear combination lamp has been exemplified in the embodiment, the vehicle lamp to which the present invention is applied is not limited to the vehicle lamp on the rear side such as the above-mentioned tail lamp, and the present invention can also be applied to a vehicle lamp on the front side.

That is, in the vehicle lamp to which the present invention is applied, in addition to the above-mentioned tail lamp, for example, the present invention can be widely applied to a vehicle lamp such as a brake lamp, a back lamp, a daylight running lamp (DRL), a width indicator (position lamp), a direction indicator (turn lamp), or the like. In addition, a color of light emitted from the light source is not limited to the above-mentioned red light, and may be appropriately changed according to a purpose of the vehicle lamp, for example, white light, orange light, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:
  a light source;
  a light guiding body configured to guide light emitted from the light source; and
  a shade configured to shield surroundings of the light guiding body,
  wherein the light guiding body has:
    a light guide section that is located in front of the light source and that has a dimension in which a dimension in one direction perpendicular to an optical axis of the light emitted from the light source is smaller than a dimension in a second direction perpendicular to the optical axis and the one direction;
    an incidence section that is located on a side of the light guide section facing the light source and that is configured to cause the light emitted from the light source to enter the light guide section; and
    an emission section that is located on a side of the light guide section opposite to the incidence section and that is configured to emit the light guided inside of the light guide section to an outside of the light guide section,
  wherein the incidence section has a first incidence surface that is flat in a cross section in the one direction,
  wherein the incidence section has a second incidence surface inclined forward from one side and/or another side with respect to the first incidence surface in the cross section in the one direction,
  wherein the shade has an opening section through which light, emitted from the light source, passes, and
    (a) the light that passes through the opening section entering the incidence section, and
    (b) the light that passes through the opening section, and enters the incidence section, providing an angle range of the light defined by shielding of the shade about the opening section;
  wherein, at the cross section in the one direction, the optical axis is located at a position offset toward one side in the one direction with respect to a central axis of the light guide section.

2. The vehicle lamp according to claim 1, wherein, regarding the light which has passed through the opening section and which enters the incidence section, an angular range on one side with respect to the optical axis is smaller than an angular range on another side with respect to the optical axis.

3. The vehicle lamp according to claim 2, wherein the opening section is located between the light source and the incidence section.

4. The vehicle lamp according to claim 1, wherein the shade has an inclined surface inclined forward from one side and/or another side of the shade with the opening section being interposed therebetween in the cross section in the one direction, and the inclined surface is inclined at an angle in with the light passed through the opening section does not directly enter the inclined surface.

5. The vehicle lamp according to claim 1, wherein the opening section is located between the light source and the incidence section.

6. The vehicle lamp according to claim 1, wherein the incidence section is located inside the opening section.

7. The vehicle lamp according to claim 6, wherein the opening section and the incidence section have shapes that match with each other.

8. The vehicle lamp according to claim 1, wherein a plurality of the light source are provided next to each other in the second direction.

9. The vehicle lamp according to claim 1, further comprising an extension that is located on one side in the one direction with respect to the light guide section and that is configured to cover surroundings of the light guiding body.

10. The vehicle lamp according to claim 9, wherein the opening section is located between the light source and the incidence section.

11. A vehicle lamp comprising:

a plurality of light sources configured to emit light radially;

a light guiding body that has:
an incidence section, which is located in front of the plurality of light sources and into which the light emitted from the plurality of light sources enters, and
an emission section which is configured to emit the light that has entered from the incidence section to an outside; and a shade that has an opening section between the plurality of light sources and the incidence section and that is configured to shield light which does not pass the opening section of the light emitted from the plurality of light sources, wherein the plurality of light sources are provided next to each other with predetermined intervals at a position facing the incidence section, wherein the light guiding body is constituted by a light transmissive member and that has a light guide section in which the incidence section and the emission section are integrally formed, wherein the emission section is located on a front end side of the light guide section, wherein the light guide section has a shape which is elongated in a widthwise direction when seen in a front view and which is in a plate shape in a forward/rearward direction, wherein the incidence section is located on an optical axis of light emitted from each of the light sources among the light radially emitted from each of the plurality of light sources, wherein the opening section has a shape which is elongated in the widthwise direction when seen in the front view, wherein a size of a cross section of the opening section in a height direction has a size which passes only a part of light that is within a predetermined angular range including optical axis of each of the light sources among the light radially emitted from each of the plurality of light sources, wherein, in the cross section in the height direction, the incidence section has a first incidence surface which is flat and a second incidence surface which is inclined forward from one side and/or another side with respect to the first incidence surface, and wherein, regarding the optical axis of light emitted from each of the light sources of the plurality of light sources in the cross section in the height direction, the optical axis is located at a position offset toward one side in the height direction with respect to a central axis of a width of the height direction of the light guide section.

12. The vehicle lamp according to claim 11, wherein the plurality of light sources are mounted on a side of one surface of a board.

13. The vehicle lamp according to claim 12, wherein the plurality of light sources are provided next to each other on a front surface side of the board at predetermined intervals so as to overlap the light guide section when seen in a front view.

14. The vehicle lamp according to claim 12, wherein the plurality of light sources are constituted by respective light emitting diodes (LEDs).

15. The vehicle lamp according to claim 14, wherein the vehicle lamp is a lamp of at least one selected from the group consisting of: a tail lamp, a brake lamp, a back lamp, a daylight running lamp (DRL), a width indicator (position lamp) and a direction indicator (turn lamp).

* * * * *